United States Patent Office 3,350,380
Patented Oct. 31, 1967

3,350,380
PROCESS FOR THE PREVENTION OF COLD FLOW IN POLYBUTADIENE
Charles W. Strobel, Borger, Tex., assignor to Phillips Petroleum Company, a corporation of Delaware
No Drawing. Original application Aug. 23, 1962, Ser. No. 218,853, now Patent No. 3,236,821, dated Feb. 22, 1966. Divided and this application Feb. 15, 1965, Ser. No. 432,808
9 Claims. (Cl. 260—94.7)

This is a division of application Ser. No. 218,853, filed Aug. 23, 1962, now U.S. 3,236,821.

This invention relates to a method for preventing or substantially reducing the tendency of certain polybutadienes to cold flow. In one aspect, it relates to a novel composition comprising a polybutadiene and certain treating agents which reduce the tendency of the polybutadiene to cold flow.

In recent years a great deal of research work has been directed toward the production improved rubbery polymers. One of the products that has attracted widespread attention because of its superior properties is a polybutadiene containing a high percetnage, e.g., at least 85 percent, of cis 1,4-addition. Another polymer that has achieved considerable importance is a polybutadiene prepared by polymerizing 1,3-butadiene with an organolithium catalyst. The physical properties of these polymers are of such a nature that they are particularly suitable for the fabrication of automobile and truck tires and other articles for which conventional synthetic polymers have heretofore been comparatively unsatisfactory. However, in the processing of the polymers, particularly in packaging, shipping and storage, a certain amount of difficulty has been encountered because of the tendency of the polymers to cold flow when in the unvulcanized state. For example, if cracks or punctures develop in the packages used in storing the polymers, polymer will flow from the packages with a resulting loss or contamination and sticking together of stacked packages.

It is an object of this invention, therefore, to provide a method for eliminating or substantially reducing the tendency of cis-polybutadiene and organolithium-catalyzed polybutadiene to cold flow when in the unvulcanized state.

Another object of the invention is to provide a method for producing a cis-polybutadiene and an organolithium-catalyzed polybutadiene so as to provide products which have a reduced tendency to cold flow.

A further object of the invention is to provide a novel composition which contains cis-polybutadiene or an organolithium-catalyzed polybutadiene and certain treating agents which prevent or substantially reduce cold flow.

Other and further objects and advantages of the invention will become apparent to those skilled in the art upon consideration of the accompanying disclosure.

The present invention is concerned with the production of improved polybutadiene products which have a reduced tendency to cold flow. Thus, the invention resides in an improvement in a process for polymerizing 1,3-butadiene with a catalyst system selected from the group consisting of (1) an iodine-containing catalyst including an organometal and a titanium halide, and (2) an organolithium catalyst. Broadly speaking, the improvement comprises adding to the polymerization mixture a member selected from the group consisting of oxygen and sulfur dioxide. When an organolithium catalyst is selected as the catalyst for the polymerization, in addition to the oxygen or sulfur dioxide there is added to the polymerization reaction mixture an organometal having the formula $R_nM$, wherein R is selected from the group consisting of aliphatic, cycloaliphatic and aromatic radicals, M is a metal selected from the group consisting of sodium, potassium, beryllium, magnesium, zinc, cadmium, mercury, aluminum, gallium, indium, thallium, and lead, and $n$ is an integer equal to the valence of the metal M. The R radical in the aforementioned formula preferably contains from 1 to 20, inclusive, carbon atoms. The addition of the treating agents of this invention to the polymerization reaction mixture also results in the inactivation of the catalyst and termination of the polymerization reaction. When polymerizing butadiene with an organometal-type catalyst, the reaction is normally terminated or shortstopped when the conversion has reached the desired level by the addition of a catalyst-inactivating agent. Compounds that have been used in this manner include a variety of materials, such as water, alcohols and rosin acids. These materials are effective shortstopping agents, but the product produced has a tendency to cold flow when in the unvulcanized state. It was completely unexpected, therefore, when it was found that the treating agents of this invention, which also function as shortstopping agents, resulted in a polybutadiene product having a reduced tendency to cold flow. Furthermore, the valuable properties characteristic of cis-polybutadiene and organolithium-catalyzed polybutadiene vulcanizates are retained by proceeding in accordance with the present invention.

The sulfur dioxide can be added to the polymerization reaction mixture as a gas or a liquid. It can also be used as a solution in a hydrocarbon, preferably similar to the hydrocarbon diluent employed in the polymerization. Oxygen can be added to the reaction mixture as gaseous or liquid oxygen or as air in the gaseous or liquid state. When a $R_nM$ compound is also added in the case of the organolithium-catalyzed polymerization, this material is preferably employed as a solution in a hydrocarbon similar to the diluent used in the polymerization. However, it is also within the scope of the invention to charge the material by itself.

In accordance with the above-described embodiment of the invention, the treating agents are added to the polymerization reaction mixture prior to quenching or shortstopping of the reaction. When utilizing only sulfur dioxide or oxygen in the case of the cis-polybutadiene polymerization, this material is most conveniently introduced in the form of a gas. When utilizing both sulfur dioxide or oxygen and the organometal as treating agents as in the case of the organolithium-catalyzed polybutadiene, a preferred method of operation is to add the organometal compound as a solution in a hydrocarbon and thereafter introduce the sulfur dioxide or the oxygen in the form of a gas. In either case, the reaction mixture is then agitated during the treating period. The treating agents are effective at whatever temperature is employed in the polymerization. However, sufficient contact time with the polymer solution must be allowed in order to achieve an optimum reduction in cold flow. The contact time is dependent, at least to a certain extent, upon the temperature, a longer time generally being required as the temperature is lowered. The contact time is usually in the range of 5 minutes to 50 hours.

Examples of specific $R_nM$ compounds suitable for use include:

trimethylaluminum
triisobutylaluminum
tridodecylaluminum trieicosylaluminum
tricyclohexylaluminum
tri(4-methylcyclohexyl)aluminum
tribenzylaluminum
triphenylaluminum
tri(2-naphthyl)aluminum
n-propyldiphenylaluminum
diethyl-n-hexylaluminum
di-n-butylmercury
methyleicosylmercury
diethylzinc
diphenylzinc
ethylcyclopentylzinc
di(3-isopropylcyclohexyl)beryllium
dibutylberyllium
diethylcadmium
diisopropylcadmium
diphenylmagnesium
di-n-propylmagnesium
dimethylmagnesium
methylethylmagnesium
tetraethyllead
trimethylphenyllead
triethylgallium
tri-n-hexylindium
triisopropylthallium
n-pentylsodium
phenylsodium
n-butylpotassium
phenylpotassium and the like.

As discussed hereinbefore, the treating agents of this invention, i.e., oxygen or sulfur dioxide and, in the case of the organolithium-catalyzed polymerization, the $R_nM$ compound, are added to the polymerization reaction mixture prior to the inactivation of the catalyst. In another embodiment of the invention, the polybutadiene recovered from the polymerization after quenching or shortstopping of the polymerization reaction is treated with the treating agents of this invention in order to reduce the tendency of the polymers to cold flow. In accordance with this embodiment, a cis-polybutadiene or an organolithium-catalyzed polybutadiene is treated with oxygen or sulfur dioxide and a compound having the formula $R_nM$, wherein R, M and $n$ are as defined hereinbefore. It is to be understood that in treating the polybutadiene product both the oxygen or sulfur dioxide and the $R_nM$ compound are utilized. These materials can be added to the polybutadiene in any of the forms discussed hereinbefore, i.e., in the case of the sulfur dioxide or oxygen in the form of a gas, liquid or solution and in the case of the organometal as a solution or per se. It was completely unexpected when it was found that this combination of materials is effective in reducing cold flow since either of the materials is ineffective when used alone. While this embodiment of the invention is not dependent upon any particular reaction mechanism, it is important that both ingredients of the treating composition be intimately blended with the polybutadiene and that the time and temperature of the treatment be adjusted to produce the desired effect.

Any suitable method for incorporating the treating agents into the polybutadiene product which will give an intimate blend of the treating agents with the rubber can be utilized. A convenient procedure is to blend a solution of the $R_nM$ compound with a solution of the polymer and thereafter introduce the sulfur dioxide or oxygen in the form of a gas. The mixture is then agitated during the treating period. The treating temperature can vary over a rather broad range, e.g., from 50 to 250° F. It is usually preferred to operate at a temperature above 75° F. The time of treatment is dependent upon the temperature, longer periods being required for lower temperatures. However, the time of treatment is generally in the range of 5 minutes to 50 hours.

In one method of operation, the cis-polybutadiene or the organo-lithium-catalyzed polybutadiene is recovered from the reaction mixture in which it was prepared and dissolved in a hydrocarbon solvent or other material which is inert with respect to the treating agents. The polymer is then in condition for treatment as herein described. An alternative procedure is to quench the polymerization reaction mixture with a small amount of water after which excess water is removed with a suitable drying agent, such as anhydrous calcium sulfate. The resulting essentially anhydrous polymer solution is then treated with the treating agents. When operating in this manner, the steps of recovering and redissolving the polymer are eliminated. Another method for effecting the treatment of the polymer is to incorporate the treating agents into the rubbery polymer in a Banbury mixer or similar kneading device. When using this method of operation, the $R_nM$ compound and polymer can be added to the mixer after which the mixing is carried out in an atmosphere of sulfur dioxide, oxygen or air. It is to be understood that in accordance with this embodiment of the invention the treating agents are employed with polymers in which no active polymerization catalyst is present. When treatment of the polymer is conducted in solution, the polymer can be recovered by any conventional means. For example, the polymer can be coagulated with a suitable reagent, such as an alcohol, or the solvent can be removed by steam stripping.

The amount of the sulfur dioxide or oxygen used in the practice of the present invention can vary over a relatively wide range, e.g., from 1 to 60, preferably from 1 to 25, millimols per 100 grams of polybutadiene. When the $R_nM$ compound is employed, the amount used is generally in the range of 0.5 to 25 millimols per 100 grams of polybutadiene. When employing both of the treating agents, an excess of the sulfur dioxide or oxygen is usually used. Generally, from 1.1 to 25 millimols of sulfur dioxide or oxygen per millimol of $R_nM$ compound is employed.

The treating agents of this invention are applicable to polybutadienes containing a high percentage of cis 1,4-addition and to the process for preparing such products. The cis-polybutadiene can be prepared by polymerizing butadiene with a catalyst system which includes an organometal compound and iodine, present either in the free or combined state. This polymerization system produces a cis-polybutadiene having outstanding properties when in the cured state but having a tendency to cold flow in the unvulcanized state. The term "cis-polybutadiene" as used herein is intended to include a polybutadiene containing at least 85 percent cis 1,4-addition, e.g., from 85 to 98 percent and higher.

The cis-polybutadienes can be prepared by polymerizing 1,3-butadiene with any one of a large number of different stereospecific catalyst systems. It is usually preferred to employ a catalyst which is selected from the group consisting of (1) a catalyst comprising an organometal compound having the formula $R_mM$, wherein R is an alkyl, cycloalkyl, aryl, alkaryl, aralkyl, alkylcycloalkyl, cyclocycloalkyl, arylcycloalkyl or cycloalkylaryl radical, M is alkylalkyl, arylcycloalkyl or cycloalkylaryl radical, M is aluminum, mercury, zinc, beryllium, cadmium, magnesium, sodium or potassium, and $m$ is equal to the valence of the metal M, and titanium tetraiodide, (2) a catalyst comprising an organometal compound having the formula $R_nM'$, wherein R is an organo radical as defined above, M' is aluminum, magnesium, lead, sodium or potassium, and $n$ is equal to the valence of the metal M', titanium tetrachloride and titanium tetraiodide, (3) a catalyst comprising an organometal compound having the formula $R_aM''$, wherein R is an organo radical as defined above, M'' is aluminum or magnesium and $a$ is equal to the valence of the metal M'', a compound having the formula $TiX_b$, wherein X is chlorine or bromine and $b$ is an integer from 2 to 4, inclusive, and elemental iodine, (4) a catalyst comprising an organometal compound having the formula $R_xM'''$, wherein R is an organo radical as defined above, $M'''$ is aluminum, gallium, indium, or thallium, and $x$ is equal to the valence of the metal $M'''$, a titanium halide having the formula $TiX_4$, wherein X is chlorine or bromine, and an inorganic halide having the formula $M^{iv}I_c$, wherein $M^{iv}$ is beryllium, zinc, cadmium, aluminum, gallium, indium, thallium, silicon, germanium, tin, lead, phosphorus, antimony, arsenic, and bismuth, and $c$ is an integer from 2 to 5, inclusive, and (5) a catalyst comprising an organo compound having the formula $R_xM'''$, wherein R, $M'''$ and $x$ are as defined above, titanium tetraiodide, and an inorganic halide having the formula $M^vX_d$, wherein $M^v$ is aluminum, gallium, indium, thallium, germanium, tin, lead, phosphorus, antimony, arsenic or bismuth, X is chlorine or bromine, and $d$ is an integer from 2 to 5, inclusive. The R radicals of the aforementioned formulas preferably contain up to and including 20 carbon atoms.

The following are examples of preferred catalyst systems which can be used to polymerize 1,3-butadiene to a cis 1,4-polybutadiene:

triisobutylaluminum and titanium tetraiodide
triethylaluminum and titanium tetraiodide
triisobutylaluminum, titanium tetrachloride and titanium tetraiodide
triethylaluminum, titanium tetrachloride and titanium tetraiodide
diethylzinc and titanium tetraiodide
dibutylmercury and titanium tetraiodide
triisobutylaluminum, titanium tetrachloride and iodine
triethylaluminum, titanium tetrabromide and iodine
n-amylsodium and titanium tetraiodide
phenylsodium and titanium tetraiodide
n-butylpotassium and titanium tetraiodide
phenylpotassium and titanium tetraiodide
n-amylsodium, titanium tetrachloride and titanium tetraiodide
triphenylaluminum and titanium tetraiodide
triphenylaluminum, titanium tetraiodide and titanium tetrachloride
triphenylaluminum, titanium tetrachloride and iodine
tri-alpha-naphthylaluminum, titanium tetrachloride and iodine
tribenzylaluminum, titanium tetrabromide and iodine
diphenylzinc and titanium tetraiodide
di-2-tolylmercury and titanium tetraiodide
tricyclohexylaluminum, titanium tetrachloride and titanium tetraiodide
ethylcyclopentylzinc and titanium tetraiodide
tri(3-isobutylcyclohexyl)aluminum and titanium tetraiodide
tetraethyllead, titanium tetrachloride and titanium tetraiodide
trimethylphenyllead, titanium tetrachloride and titanium tetraiodide
diphenylmagnesium and titanium tetraiodide
di-n-propylmagnesium, titanium tetrachloride and titanium tetraiodide
dimethylmagnesium, titanium tetrachloride and iodine
diphenylmagnesium, titanium tetrabromide and iodine
methylethylmagnesium and titanium tetraiodide
dibutylberyllium and titanium tetraiodide
diethylcadmium and titanium tetraiodide
diisopropylcadmium and titanium tetraiodide
triisobutylaluminum, titanium tetrachloride, and antimony triiodide
triisobutylaluminum, titanium tetrachloride and aluminum triiodide
triisobutylaluminum, titanium tetrabromide, and aluminum triiodide
triethylaluminum, titanium tetrachloride and phosphorus triiodide
tri-n-dodecylaluminum, titanium tetrachloride and tin tetraiodide
triethylgallium, titanium tetrabromide and aluminum triiodide
tri-n-butylaluminum, titanium tetrachloride and antimony triiodide
tricyclopentylaluminum, titanium tetrachloride and silicon tetraiodide
triphenylaluminum, titanium tetrachloride and gallium triiodide
triisobutylaluminum, titanium tetraiodide and tin tetrachloride
triisobutylaluminum, titanium tetraiodide and antimony trichloride
triisobutylaluminum, titanium tetraiodide and aluminum trichloride
triisobutylaluminum, titanium tetraiodide and tin tetrabromide
triethylgallium, titanium tetraiodide and aluminum tribromide
triethylaluminum, titanium tetraiodide and arsenic trichloride
tribenzylaluminum, titanium tetraiodide and germanium tetrachloride.

The polymerization process for preparing cis-polybutadiene is carried out in the presence of a hydrocarbon diluent which is not deleterious to the catalyst system. Examples of suitable diluents include aromatic, paraffinic, and cycloparaffinic hydrocarbons, it being understood that mixtures of these materials can also be used. Specific examples of hydrocarbon diluents include benzene, toluene, n-butane, isobutane, n-pentane, isooctane, n-dodecane, cyclopentane, cyclohexane, methylcyclohexane, and the like. It is often preferred to employ aromatic hydrocarbons as the diluent.

The amount of the catalyst used in preparing the cis-polybutadiene product can vary over a rather wide range. The amount of the organometal used in the catalyst composition is usually in the range of 0.75 to 20 mols per mol of the halogen-containing component, i.e., a metal halide with or without a second metal halide or elemental iodine. The mol ratio actually used in a polymerization will depend upon the particular components employed in the catalyst system. However, a preferred mol ratio is generally from 1:1 to 12:1 of the organometal compound to the halogen-containing component. When using a catalyst comprising an organometal compound and more than one metal halide, e.g., titanium tetrachloride and titanium tetraiodide, titanium tetrachloride or tetrabromide and aluminum iodide, the mol ratio of the tetrachloride or tetrabromide to the iodide is usually in the range of 0.05:1 to 5:1. With a catalyst system comprising an organometal compound, a titanium chloride or bromide and elemental iodine, the mol ratio of titanium halide to iodine is generally in the range of 10:1 to 0.25:1, preferably 3:1 to 0.25:1. The concentration of the total catalyst composition, i.e., organometal and halogen-containing component, is usually in the range of 0.01 to 10 weight percent, preferably in the range of 0.01 to 5 weight percent, based on the total amount of 1,3-butadiene charged to the reactor system.

The process for preparing cis-polybutadiene can be carried out at temperatures varying over a rather wide range, e.g., from −100 to 250° F. It is usually preferred to operate at a temperature in the range of −30 to 160° F. The polymerization reaction can be carried out under autogenous pressure or at any suitable pressure sufficient to maintain the reaction mixture substantially in the liquid phase. The pressure will thus depend upon the particular diluent employed and the temperature at which the polymerization is conducted. However, higher pressures can be employed if desired, these pressures being obtained by some such suitable method as the pressurization of the reactor with a gas which is inert with respect to the polymerization reaction.

The present invention is also applicable to the process for polymerizing 1,3-butadiene with an organolithium compound and to the products obtained by this process. The polybutadienes prepared with an organolithium catalyst generally contain from 35 to 48 percent cis 1,4-addition, from 45 to 55 percent trans 1,4-addition, and from 6 to 10 percent 1,2-addition. The present invention is particularly applicable to low inherent viscosity polybutadienes prepared by this method. Such polymers generally have an inherent viscosity in the range of 0.75 to 3. While the low inherent viscosity polybutadienes possess outstanding properties, they have a tendency to cold flow when in the unvulcanized state.

Organolithium compounds suitable for use in the polymerization have the formula $RLi_x$, wherein R is a hydrocarbon radical selected from the group consisting of aliphatic, cycloaliphatic and aromatic radicals and $x$ is an integer from 1 to 4, inclusive. The R in the formula has a valence equal to the integer and preferably contains from 1 to 20, inclusive, carbon atoms, although higher molecular weight compounds can be utilized. In preparing the polybutadiene, it is often preferred to use an alkyllithium compound, such as n-butyllithium, as the catalyst. Examples of other suitable organolithium compounds include:

methyllithium
isopropyllithium
tert-octyllithium
n-decyllithium
phenyllithium
naphthyllithium
4-butylphenyllithium
p-tolyllithium
4-phenylbutyllithium
cyclohexyllithium
4-butylcyclohexyllithium
4-cyclohexylbutyllithium
dilithiomethane
1,4-dilithiobutane
1,10-dilithiodecane
1,20-dilithioeicosane
1,4-dilithiocyclohexane
1,4-dilithio-2-butene
1,8-dilithio-3-decene
1,4-dilithiobenzene
1,5-dilithionaphthalene
1,2-dilithio-1,2-diphenylethane
9,10-dilithio-9,10-dihydroanthracene
1,2-dilithio-1,8-diphenyloctane
1,3,5-trilithiopentane
1,5,15-trilithioeicosane
1,3,5-trilithiocyclohexane
1,2,5-trilithionaphthalene
1,3,5-trilithioanthracene
1,3,5,8-tetralithiodecane
1,5,10,20-tetralithioeicosane
1,2,3,5-tetralithiocyclohexane
1,2,3,5-tetralithio-4-hexylanthracene and the like.

The process used in preparing the organolithium-catalyzed polybutadiene can be conducted at a temperature in the range of −100 to 250° F., preferably at a temperature in the range of 0 to 180° F. The polymerization reaction can be carried out under autogenous pressures. It is usually desirable to operate at a pressure sufficient to maintain the reaction mixture in the liquid phase. The polymerization is conducted in the presence of a hydrocarbon diluent similar to that employed in the cis-polybutadiene polymerization process as described hereinbefore. The actual pressure used in the process will depend upon the particular diluent employed and the temperature at which the polymerization is to be conducted.

A polybutadiene having a desired inherent viscosity can be readily prepared by varying the concentration of the organolithium compound. For example, with a completely dry system and no other impurities present to destroy the organolithium compound, about 7 millimols of effective catalyst per 100 grams of monomer is generally required to give a polymer having an inherent viscosity of 0.75, and about 0.25 millimols of effective catalyst per 100 grams of monomer is generally required for the production of a polymer having an inherent viscosity of 3.0. It has been found that for practical operations approximately 0.3 mhm or more of catalyst is needed as a scavenger for the system.

Various materials are known to be detrimental to the organolithium catalyst and to the catalyst employed in preparing the cis-polybutadiene. These materials include carbon dioxide, oxygen and water. It is usually desirable, therefore, that the butadiene and diluent be freed of these materials as well as other materials which may tend to inactivate the catalyst. Furthermore, it is desirable to remove air and moisture from the reaction vessel in which the polymerization is to be conducted. Upon completion of the polymerization reaction in which cis-polybutadiene or the organolithium-catalyzed polybutadiene is prepared, the reaction mixture is then treated to inactivate the catalyst and recover the rubbery polymer. In accordance with one embodiment of the present invention, the catalyst is inactivated by adding to the reaction mixture sulfur dioxide or oxygen and in the case of the organolithium-catalyzed polybutadiene the $R_nM$ compound as well. After this treatment of the reaction mixture, the polymer is then recovered by conventional methods, such as steam stripping, alcohol coagulation or the like. In accordance with another embodiment of the invention as hereinbefore described, the treating agents are added to the polymers in which no active polymerization catalyst is present. Accordingly, the polymerization reaction mixture is first treated to inactivate the catalyst and the rubbery polymer may also be recovered. A suitable method for accomplishing this result involves steam stripping the diluent from the polymer. In another suitable method, the catalyst-inactivating material, such as an alcohol, is added to the mixture so as to inactivate the catalyst and cause precipitation of the polymer. The polymer is then separated from the alcohol and diluent by any suitable means, such as decantation or filtration. Thereafter, the polymer is treated with the treating agent of this invention as described hereinbefore. It has been found to be advantageous to add an antioxidant, such as 4,4′-methylene-bis-(2,6-di-tert-butylphenol), to the polymer solution prior to recovery of the polymer.

A more comprehensive understanding of the invention may be obtained by referring to the following illustrative examples, which are not intended, however, to be unduly limitative of the invention.

*Example I*

Butadiene was polymerized in the presence of a catalyst system consisting of triisobutylaluminum, iodine, and titanium tetrachloride. This system produces a polymer containing about 95 percent cis 1,4-addition. The following recipe was employed:

RECIPE

| | |
|---|---|
| 1,3-butadiene, parts by weight | 100 |
| Toluene, parts by weight | 1100 |
| Triisobutylaluminum, mhm[1] | 2.75 |
| Iodine, mhm[1] | 0.80 |
| Titanium tetrachloride, mhm[1] | 0.46 |
| Temperature, °F. | 41 |
| Time, hours | 4 |
| Conversion, percent approx. | 90 |

[1] Millimols per 100 parts monomer.

The procedure followed was to charge the toluene first, after which the reactor was purged with nitrogen. The butadiene was then added, followed by the triisobutylaluminum, iodine, and titanium tetrachloride in the order named. Two series of runs were conducted in which the reaction mixtures were treated by injection of 5 millimols per 100 parts monomer of sulfur dioxide gas. The sulfur dioxide acted as a shortstopping agent, thereby terminating the reactions. In one series of runs, the reaction mixtures were at 41° F. when the sulfur dioxide was added. In the other series, the reaction mixtures were at 122° F. A control run was carried out in which the reaction was shortstopped at 41° F. with isopropyl alcohol. After variable periods of contact of sulfur dioxide with the reaction mixtures, the polymers (including the control) were coagulated with isopropyl alcohol and separated. An antioxidant was then incorporated into the wet polymers, after which the products were dried.

Samples of the polymer products were tested to measure their tendency to cold flow. The results of the tests are shown below in Table I.

TABLE I

| Run No. | Contact Time,[2] Hours | Cold Flow, mg./min.[3], Reactions Terminated at— | |
|---|---|---|---|
| | | 41° F. | 122° F. |
| 1[1] | | 6.2 | |
| 2 | 0.67 | 4.9 | 2.5 |
| 3 | 1.1 | 4.5 | 2.4 |
| 4 | 2.2 | 2.9 | 3.0 |
| 5 | 20.0 | | 1.7 |

[1] Control, shortstopped with isopropyl alchohol.
[2] Time between addition of $SO_2$ and addition of isopropyl alcohol to coagulate polymer.
[3] Cold flow was measured by extruding the rubber through a ¼-inch orifice at 3.5 p.s.i. pressure and a temperature of 40° C. (122° F.). After allowing 10 minutes to reach steady state, the rate of extrusion was measured and the values reported in milligrams per minute.

The data in Table I show that the addition of sulfur dioxide to the polymerization reaction mixtures resulted in the production of polymer products having a greatly reduced tendency to cold flow.

*Example II*

Variable initiator levels were employed for the polymerization of butadiene in the presence of triisobutylaluminum, iodine, and titanium tetrachloride. Two runs were made at each level. The reaction mixture of one of these runs was treated with sulfur dioxide while the other run was shortstopped with isopropyl alcohol. The procedure followed was the same as that described in Example I. The recipes employed in the runs as well as the conditions for the sulfur dioxide treatment are shown below.

POLYMERIZATION RECIPES

| | A | B | C |
|---|---|---|---|
| 1,3-butadiene, parts by weight | 100 | 100 | 100 |
| Toluene, parts by weight | 860 | 860 | 860 |
| Triisobutylaluminum, mhm | 2.4 | 2.6 | 2.8 |
| Iodine, mhm | 0.70 | 0.76 | 0.82 |
| Titanium tetrachloride, mhm | 0.40 | 0.43 | 0.47 |
| Temperature, ° F | 41 | 41 | 41 |
| Time, hours | 18 | 18 | 18 |
| Sulfur dioxide, mhm | 5 | 5 | 5 |
| Temperature, ° F | 122 | 122 | 122 |
| Time, hours | 1.5 | 1.5 | 1.5 |

Certain properties of the products obtained were determined. The results of these determinations are shown below in Table II.

TABLE II

| | Isopropyl Alcohol | $SO_2$ | Isopropyl Alcohol | $SO_2$ | Isopropyl Alcohol | $SO_2$ |
|---|---|---|---|---|---|---|
| Mooney (ML-4 at 212° F.)[1] | 27 | 35 | 20 | 27 | 17 | 24 |
| Inherent Viscosity[2] | 2.14 | 1.98 | 1.94 | 2.08 | 1.80 | 1.92 |
| Gel, percent[3] | 0 | 0 | 0 | 0 | 0 | 0 |
| Cold Flow, mg./min.[4] | 11.9 | 0.24 | 12.7 | 0.33 | 28.4 | 4.00 |
| Microstructure, percent:[5] | | | | | | |
| Cis | | 94.7 | | 93.8 | | 93.5 |
| Trans | | 2.3 | | 3.0 | | 3.1 |
| Vinyl | | 3.0 | | 3.2 | | 3.4 |

[1] ASTM D-297-55T.
[2] One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia-type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.
[3] Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, 2-ounce bottle. A piece of folded quarter-inch hardware cloth in the bottom of the bottle supported the cage with minimum contact. The bottle containing the cage was weighed to the nearest 0.02 gram during a minimum 3-minute draining period after which the cage was withdrawn and the bottle again weighed to the nearest 0.02 gram. The difference in the two weighings is the weight of the cage plus the toluene retained by it, and by subtracting the weight of the empty cage from this value the weight of toluene retention is found, i.e., the cage calibration. In the gel determination, after the cage containing the sample had stood for 24 hours in toluene, the cage was withdrawn from the bottle with the aid of forceps and placed in the 2-ounce bottle. The same procedure was followed for determining the weight of swelled gel as was used for calibration of the cage. The weight of swelled gel was corrected by subtracting the cage calibration.
[4] See footnote (3) to Table I.
[5] Determined by infrared analysis using a commercial infrared spectrometer. The polymers were dissolved in carbon disulfide to form solutions having 25 grams of ploymer per liter of solution. The infrared spectrum of such a solution (percent transmission) is then determined in a commercial infrared spectrometer. The percent of the total unsaturation present as trans 1,4- is calculated according to the following equation and consistent units:

$$\Sigma = L/tc$$

where $\Sigma$ = extinction coefficient (liters-mols$^{-1}$-centimeters$^{-1}$); $L$ = extinction (log $I_o/I$); $t$ = path length (centimeters); and $c$ = concentration (mols double bond/liter). The extinction is determined at the 10.35 micron band and the extinction coefficient used is 146 (liters-mols$^{-1}$-centimeters$^{-1}$).

The percent of the total unsaturation present as 1,2- (or vinyl) is calculated according to the above equation, using the 11.0 micron band and an extinction coefficient of 209 (liters-mols$^{-1}$-centimeters$^{-1}$).

The percent of the total unsaturation present as cis 1,4- is obtained by subtracting the trans 1,4- and 1,2- (vinyl) determined according to the above methods from the theoretical unsaturation assuming one double bond per each $C_4$ unit in the polymer.

The data in Table II demonstrate that the tendency of cis-polybutadiene to cold flow can be greatly reduced by treating the polymerization reaction mixture with sulfur dioxide. The data also show that even though the polymers of this invention had higher Mooney values than the isopropyl alcohol-terminated polymers, there was no significant effect on inherent viscosity.

The foregoing $SO_2$-treated polymers, and a commercial cis-polybutadiene prepared with the same type of initiator system and shortstopped with rosin acid, were evaluated in a tread stock recipe. The commercial polymer had a raw Mooney value (ML–4 at 212° F.) of 46.5, an inherent viscosity of 2.54 and a cold flow of 3.6 mg./min. The following compounding recipe was used:

RECIPE

| | Parts by Weight |
|---|---|
| Polymer | 100 |
| High abrasion furnace black | 50 |
| Zinc oxide | 3 |
| Stearic acid | 1 |
| Flexamine [1] | 1 |
| Resin 731 D [2] | 5 |
| Philrich 5 [3] | 5 |
| Sulfur | 1.75 |
| NOBS Special [4] | 1.05 |

[1] Physical mixture containing 65 percent of a complex diarylamine-ketone reaction product and 35 percent of N,N'-diphenyl-p-phenylenediamine.
[2] Disproportionated pale rosin stable to heat and light.
[3] Aromatic oil.
[4] N-oxydiethylene-2-benzothiazyl sulfenamide.

Extrusion ratings and compounded Mooney values were obtained on each of the compounded stocks. The stocks were cured for 30 minutes at 307° F. and physical properties were determined. The results of these determinations are shown below in Table III.

TABLE III

| | Reaction Mixture Treated With— | | | |
|---|---|---|---|---|
| | $SO_2$ | $SO_2$ | $SO_2$ | Rosin Acid |
| Mooney (ML-1½ at 212° F.) [1] | 34.2 | 26.5 | 23.0 | 43.5 |
| Extrusion rating (Garvey die) [2] | 12– | 12 | 12 | 7– |
| Physical Properties, Cured 30 Minutes at 307° F.: | | | | |
| $\nu \times 10^4$, moles/cc.[3] | 1.90 | 1.75 | 1.77 | 1.95 |
| 300% Modulus, p.s.i.[4] | 1,180 | 1,080 | 1,210 | 1,200 |
| Tensile, p.s.i.[4] | 2,240 | 2,260 | 2,060 | 2,365 |
| Elongation, percent [4] | 440 | 475 | 450 | 455 |
| Shore A hardness [5] | 61.0 | 60.0 | 59.0 | 61.5 |
| Heat Build-up, Δ T, ° F.[6] | 46.9 | 49.3 | 47.9 | 44.6 |
| Oven Aged 24 Hours at 212° F.: | | | | |
| 300% Modulus, p.s.i.[4] | 1,325 | 1,270 | 1,360 | 1,270 |
| Tensile, p.s.i.[4] | 1,710 | 1,510 | 1,685 | 1,760 |
| Elongation, percent [4] | 235 | 220 | 230 | 245 |
| Heat Build-up, Δ T, ° F.[6] | 35.1 | 37.5 | 34.8 | 36.5 |

[1] ASTM D-297-55T.
[2] The numeral 12 designates an extruded product considered to be perfectly formed whereas lower numerals indicate less perfect products.
[3] Determined by the swelling method of Kraus as given in Rubber World, October 1946. This value is the number of effective network chains per unit volume of rubber. The higher the number, the more the rubber is crosslinked (vulcanized).
[4] ASTM D412-51T. Scott Tensile Machine L-6. Tests made at 80° F.
[5] ASTM D676-55T. Shore Durometer, Type A.
[6] ASTM D623-52T. Method A, Goodrich Flexometer, 143 lbs./sq. in. load, 0.175 inch stroke. Test specimen is a right circular cylinder, 0.7 inch in diameter and 1 inch high.

The data in Table III show that the polymers of this invention had lower Mooney values than the commercial polymer but the physical properties of the vulcanizates were very similar.

*Example III*

A series of runs was conducted in which 1,3-butadiene was polymerized with a catalyst consisting of diethylzinc and titanium tetraiodide. The polybutadiene products obtained with this catalyst system contain at least 85 percent cis 1,4-addition. The recipe employed in the runs was as follows:

RECIPE

| | |
|---|---|
| Toluene, parts by weight | 1100 |
| 1,3-butadiene, parts by weight | 100 |
| Diethylzinc, mhm. | 2.2 |
| Titanium tetraiodide, mhm. | 1.83 |
| Temperature, °F. | 41 |
| Time, hours | 16 |
| Conversion, percent | 94.5 |

Three runs were made. Immediately following polymerization, the runs were shortstopped with sulfur dioxide, oxygen and isopropyl alcohol, the latter being used as a control. After addition of the treating agents, the temperature was held at 122° F. for one hour while the mixtures were agitated. The polymers were recovered as described in Example I and cold flow and Mooney values were determined. The results obtained are shown in Table IV.

TABLE IV

| Run | Shortstopping Agent | Cold Flow, Mg./min. | ML–4 [1] at 212° F. | Inh.[1] Visc. | Gel.[1] Percent |
|---|---|---|---|---|---|
| A | 8 mhm. $SO_2$ | 0.2 | 78 | 2.14 | 22 |
| B | 8 mhm. $O_2$ (as air) | 1.3 | 38 | 2.22 | 0 |
| C | Control | 3.9 | 24 | 1.95 | 0 |

[1] See appropriate footnotes to Tables I and II.

*Example IV*

A polybutadiene was prepared by polymerizing 1,3-butadiene with n-butyllithium. The following recipe was employed:

RECIPE

| | |
|---|---|
| Cyclohexane, parts by weight | 950 |
| 1,3-butadiene, parts by weight | 100 |
| n-butyllithium,[1] mhm.[2] | 1.2 |
| Temperature, °F. | 122 |
| Time, hours | 16 |

[1] Obtained as a normal heptane solution; diluted with cyclohexane.
[2] Millimols per 100 parts monomer.

Cyclohexane was charged first to the reactor. The reactor was then purged with nitrogen, and butyllithium was added. Conversion was substantially quantitative in 16 hours.

Various portions of the unquenched polymer solution were treated in different ways. One portion was reserved as a control, one was treated with sulfur dioxide, another with oxygen added as air, and a combination of triisobutylaluminum with either sulfur dioxide or oxygen was used to treat two other portions. Sulfur dioxide and oxygen (as air) were added in the gaseous form while triisobutylaluminum was introduced as a solution in toluene. Treatment was carried out at 122° F. for one hour while the mixtures were agitated. One part by weight per 100 parts rubber of the antioxidant 2,2'-methylene-bis(4-methyl-6-tert-butylphenol) was added to each mixture after which the polymers were coagulated in isopropyl alcohol, separated, and dried in a vacuum oven at 60° C. The results of cold flow, inherent viscosity, gel, and Mooney determinations are shown in Table V.

TABLE V

| Run No. | Treatment | Cold Flow,[1] Mg./min. | Inh.[1] Visc. | Gel,[1] Percent | ML-4 at [1] 212° F. |
|---|---|---|---|---|---|
| 1 | None | 14.2 | 2.11 | 0 | 27.0 |
| 2 | 2 mhm. triisobutylaluminum plus 8 mhm. SO₂ | 4.0 | 2.18 | 0 | 36.5 |
| 3 | 2 mhm. triisobutylaluminum plus 8 mhm. O₂ (as air) | 4.7 | 2.09 | 0 | 37.5 |
| 4 | 16 mhm. SO₂ | 12.3 | 2.01 | 0 | (2) |
| 5 | 16 mhm. O₂ (as air) | 26.6 | 2.02 | 0 | (2) |

[1] See appropriate footnotes to Tables I and II.
[2] Not detected.

These data show that a significant reduction in cold flow is achieved by treating the polymer solution with a combination of triisobutylaluminum with either sulfur dioxide or oxygen. Sulfur dioxide alone has substantially no effect on cold flow while oxygen alone increases cold flow.

*Example V*

The following recipe was employed for the polymerization of butadiene:

RECIPE

| | |
|---|---|
| Cyclohexane, parts by weight | 930 |
| 1,3-butadiene, parts by weight | 100 |
| n-Butyllithium, mhm.[1] | 1.76 |
| Temperature, ° F. | 122 |
| Time, hours | 14 |

[1] As in Example I.

The procedure for the polymerization was the same as that described in Example I. One portion of the unquenched polymer solution was reserved as a control, one was treated with triisobutylaluminum, and another with triisobutylaluminum and sulfur dioxide gas. Treatment was carried out at 122° F. for 1.5 hours. An antioxidant was added and the polymers were recovered as in Example I. The results of the runs are shown below in Table VI.

RECIPE

| | |
|---|---|
| 1,3-butadiene, parts by weight | 100 |
| Toluene, parts by weight | 860 |
| Triisobutylaluminum, mhm.[1] | 2.8 |
| Iodine, mhm.[1] | 0.82 |
| Titanium tetrachloride, mhm.[1] | 0.47 |
| Temperature, ° F. | 41 |
| Time, hours | 20 |
| Conversion, percent approx | 90 |

[1] Millimols per 100 parts monomer.

Toluene was charged first after which the reactor was purged with nitrogen. Butadiene was then added, followed by the triisobutylaluminum, iodine, and titanium tetrachloride in the order named. The reaction was short-stopped by the addition of 0.6 milliliter of water per 100 parts monomer after which anhydrous calcium sulfate was added to take up excess water.

Various portions of the polymer solution were treated in different ways. One portion was reserved as a control, sulfur dioxide was introduced into another portion, and a combination of sulfur dioxide with triisobutylaluminum

TABLE VI

| Run No. | Treatment | Cold Flow,[1] Mg./min. | Inh.[1] Visc. | Gel,[1] Percent | ML-4 at[1] 212° F. |
|---|---|---|---|---|---|
| 1 | None | 63 | 1.47 | 0 | 5.8 |
| 2 | 4 mhm. triisobutylaluminum plus 6 mhm. SO₂ | 20 | 1.57 | 0 | 8.2 |
| 3 | 4 mhm. triisobutylaluminum | 76 | 1.40 | 0 | 3.8 |

[1] See appropriate footnotes to Tables I and II.

The control polymer in these runs had a very low Mooney value and a high cold flow while a substantial reduction was achieved when sulfur dioxide was used in conjunction with this reagent.

*Example VI*

A run was conducted in which butadiene was polymerized with a catalyst consisting of triisobutylaluminum, titanium tetrachloride and iodine. The following recipe was used:

was used to treat another portion. Sulfur dioxide was added as a gas after the organometal was added as a solution in toluene. Treatment was carried out at 122° F. for one hour while the mixtures were agitated. One part by weight per 100 parts rubber of the antioxidant 2,2'-methylene-bis(4-methyl-6-tert-butylphenol) was added to each mixture after which the polymers were coagulated in isopropyl alcohol, separated, and dried in a vacuum oven at 60° C. The results of cold flow, inherent viscosity, gel, and Mooney determinations are shown in Table VII.

TABLE VII

| Run No. | Treatment | Cold Flow,[1] Mg./min. | Inh.[1] Visc. | Gel,[1] Percent | ML-4 at [1] 212° F. |
|---|---|---|---|---|---|
| 1 | None | 7.8 | 1.96 | 0 | 26.2 |
| 2 | 48 mhm. SO₂ | 7.1 | 1.99 | 0 | 25.8 |
| 3 | 8 mhm. triisobutylaluminum plus 48 mhm. SO₂ | 0.1 | 1.83 | 22 | 45.0 |

[1] See appropriate footnotes to Tables I and II.

These data show that the cold flow was reduced with a combination of triisobutylaluminum and sulfur dioxide. However, sulfur dioxide when used alone was ineffective in reducing cold flow.

*Example VII*

A portion of the polymer solution of Example VI (shortstopped with water and dried with anhydrous calcium sulfate) was treated for two hours at 122° F. with 0.8 mhm. of triisobutylaluminum and 9 mhm. of oxygen added as air. An antioxidant was added, and the polymer was recovered as in the preceding example. The results were obtained on cold flow, inherent viscosity, and gel determinations are shown in Table VIII.

TABLE VIII

| | |
|---|---|
| Cold flow, mg./min.[1] | 0.65 |
| Inherent viscosity [1] | 2.10 |
| Gel, percent [1] | 14 |

[1] See appropriate footnotes to Tables I and II.

A comparison of this run with the control in the preceding example shows that a very substantial reduction in cold flow was achieved by treating the polymer with triisobutylaluminum and air.

*Example VIII*

Various 30-gram portions of a 37-Mooney polybutadiene prepared in the presence of n-butyllithium were dissolved in 200 milliliters of toluene. The resulting solutions treated in different ways as follows: (1) triisobutylaluminum (TBA)+SO₂, (2) triisobutylaluminum+oxygen, (3) triisobutylaluminum, (4) oxygen, and (5) SO₂. Sulfur dioxide and oxygen (as air) were added in the gaseous form while triisobutylaluminum was introduced as a solution in toluene. Treatment was carried out at 122° F. for 30 minutes while the mixtures were agitated. An antioxidant was added as in Example VI and the mixtures were allowed to stand overnight at room temperature after which the polymers were coagulated in isopropyl alcohol, separated, and dried in a vacuum oven at 60° C. The results of cold flow and Mooney value determinations are shown in Table IX.

TABLE IX

| Run No. | Treatment | Cold Flow,[1] Mg./min. | ML-4 at [1] 212° F. |
|---|---|---|---|
| 1 | TBA (7 mhr.)[2] plus SO₂ (16 mhr.) | 0.8 | 48.2 |
| 2 | TBA (7 mhr.) plus O₂ (16 mhr.) as air | 0.4 | 58.0 |
| 3 | TBA (7 mhr.) | 4.1 | 41.0 |
| 4 | O₂ (16 mhr.) as air | 6.7 | 35.0 |
| 5 | SO₂ (16 mhr.) | 7.8 | 37.0 |
| 6 | None | 8.5 | 35.0 |

[1] See appropriate footnotes to Tables I and II.
[2] Millimols per 100 grams of rubber.

These data demonstrate the effectiveness of triisobutylaluminum used in combination with sulfur dioxide or oxygen in reducing the cold flow of polybutadiene prepared in the presence of an organolithium initiator. However, none of these materials when used alone was effective in reducing cold flow.

As will be evident to those skilled in the art, many variations and modifications of the invention can be practiced in view of the foregoing disclosure. Such variations and modifications are believed to come within the spirit and scope of the invention.

I claim:

1. In a process wherein a polymerization reaction mixture is formed by polymerizing 1,3-butadiene with an organolithium catalyst, the improvement which comprises adding to said reaction mixture (1) oxygen and (2) an organometal having the formula $R_nM$, wherein R is selected from the group consisting of aliphatic, cycloaliphatic and aromatic radicals, M is a metal selected from the group consisting of sodium, potassium, beryllium, magnesium, zinc, cadmium, mercury, aluminum, gallium, indium, thallium and lead, and $n$ is an integer equal to the valence of the metal M; and recovering a polybutadiene product having a reduced tendency to cold flow in the unvulcanized state.

2. In a process wherein a polymerization mixture is formed by polymerizing 1,3-butadiene in the presence of a hydrocarbon diluent with an organolithium catalyst, said polymerization occurring at a temperature in the range of −100 to 250° F. and at a pressure sufficient to maintain said reaction mixture substantially in the liquid state, the improvement which comprises adding to the unquenched reaction mixture (1) oxygen and (2) an organometal having the formula $R_nM$, wherein R is selected from the group consisting of aliphatic, cycloaliphatic and aromatic radicals, M is a metal selected from the group consisting of sodium, potassium, beryllium, magnesium, zinc, cadmium, mercury, aluminum, gallium, indium, thallium and lead, and $n$ is an integer equal to the valence of the metal M; maintaining said added oxygen and organometal in contact with said polymerization mixture at a temperature in the range of −100 to 250° F. and for a period of time in the range of 5 minutes to 50 hours; and recovering a polybutadiene product having a reduced tendency to cold flow.

3. The process according to claim 1 in which said catalyst is an alkyllithium compound and oxygen and a trialkylaluminum are added to said reaction mixture.

4. The process of claim 2 wherein said organolithium catalyst is n-butyllithium and said organometal compound is triisobutylaluminum.

5. A process for reducing the tendency of a polybutadiene to cold flow when in the unvulcanized state, said polybutadiene having been prepared by polymerizing 1,3-butadiene in the presence of a catalyst system selected from the group consisting of (1) an iodine-containing catalyst including an organometal and a titanium halide, and (2) an organolithium catalyst, said process comprising the steps of blending said polybutadiene with (1) oxygen and (2) an organometal having the formula $R_nM$, wherein R is selected from the group consisting of aliphatic, cycloaliphatic and aromatic radicals, M is a metal selected from the group consisting of sodium, potassium, beryllium, magnesium, zinc, cadmium, mercury, aluminum, gallium, indium, thallium and lead, and $n$ is an integer equal to the valence of the metal M, the amount of said oxygen used being in the range of 1 to 60 millimols per 100 grams of polybutadiene, the amount of said $R_nM$ compound being in the range of 0.5 to 25 millimols per 100 grams of polybutadiene, and the mol ratio of said oxygen to said $R_nM$ compound being in the range of 1.1 to 25, said blending occurring at a temperature in the range of 50 to 250° F. for a period of from 5 minutes to 50 hours; and recovering a polybutadiene having a reduced tendency to cold flow.

6. A process for reducing the tendency of a polybutadiene to cold flow when in the unvulcanized state, said polybutadiene having been prepared by polymerizing 1,3-butadiene in the presence of a catalyst system selected from the group consisting of (1) an iodine-containing catalyst including an organometal and a titanium halide, and (2) an organolithium catalyst, said process comprising the steps of blending said polybutadiene with (a) oxygen and (b) an organoaluminum compound having the formula $R_3Al$ wherein R is selected from the group consisting of aliphatic, cycloaliphatic and aromatic radicals, the amount of said oxygen used being in the range of 1–60 millimoles per 100 grams of polybutadiene, the amount of said organoaluminum compound being in the range of 0.5 to 25 millimoles per 100 grams of polybutadiene, and the mol ratio of said oxygen to said organoaluminum compound being in the range of 1.1 to 25, said blending occurring at a temperature in the range of 50–250° F. for a period of from 5 minutes to 50 hours; and recovering a polybutadiene having a reduced tendency to cold flow.

7. The process of claim 6 wherein said organoaluminum compound is a trialkylaluminum compound.

8. The process of claim 7 wherein said polybutadiene is a cis-polybutadiene containing at least 85 percent cis-1,4 addition.

9. The process of claim 7 wherein said organolithium catalyst is n-butyllithium.

References Cited
UNITED STATES PATENTS

| | | | |
|---|---|---|---|
| 2,979,488 | 4/1961 | Carpenter | 260—94.3 |
| 3,036,056 | 5/1962 | Rion | 260—94.3 |
| 3,094,514 | 6/1963 | Tucker | 260—94.3 |
| 3,182,052 | 5/1965 | Naylor | 260—94.3 |
| 3,245,978 | 4/1966 | Gregorian et al. | 260—94.9 |

JAMES A. SEIDLECK, *Primary Examiner.*

JOSEPH L. SCHOFER, *Examiner.*

E. J. SMITH, *Assistant Examiner.*